Jan. 21, 1964     F. R. BROWN ETAL     3,118,397
CANDY MAKING MACHINE
Filed Nov. 14, 1962     3 Sheets-Sheet 3
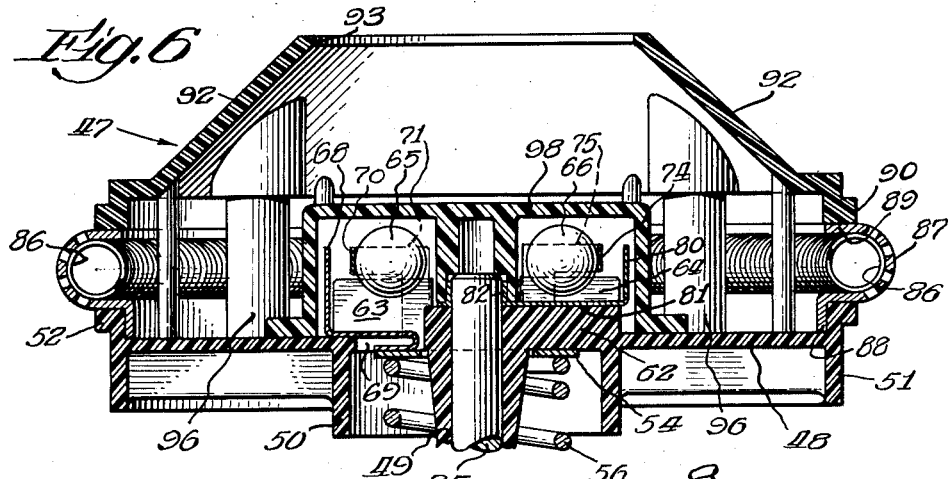
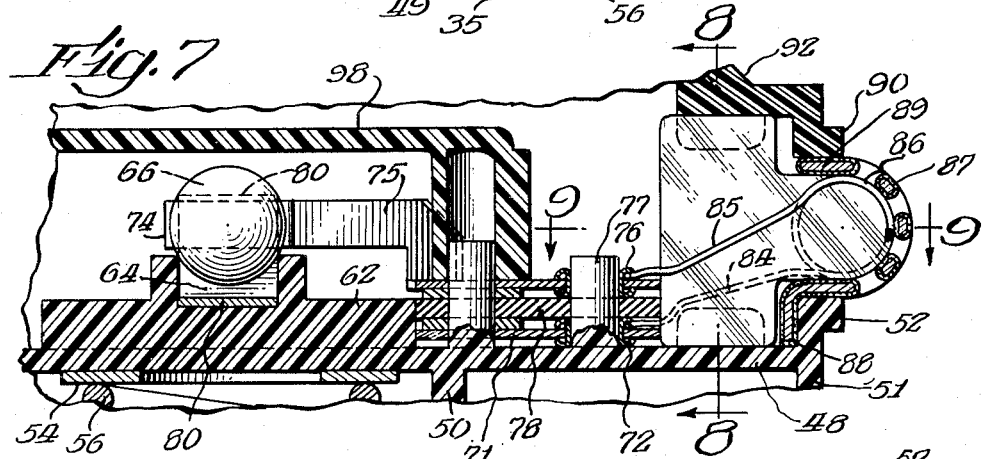
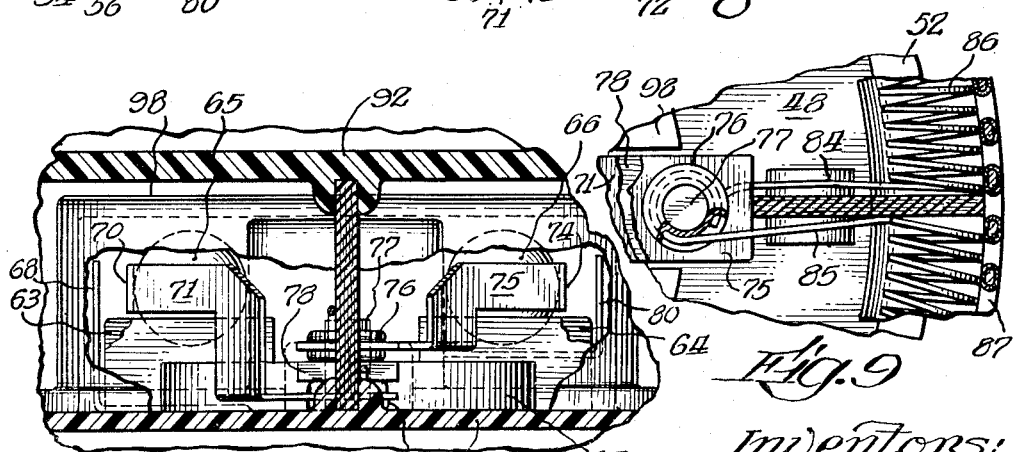
Inventors:
Frank R. Brown
Irwin J. Grabel
And Sherman D. Rubenstein
BY Robert L. Kahn Atty.

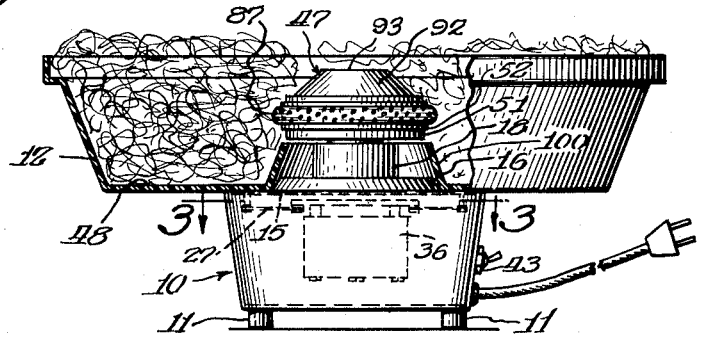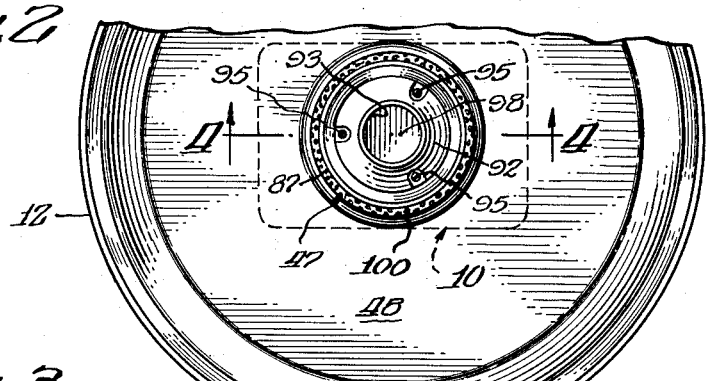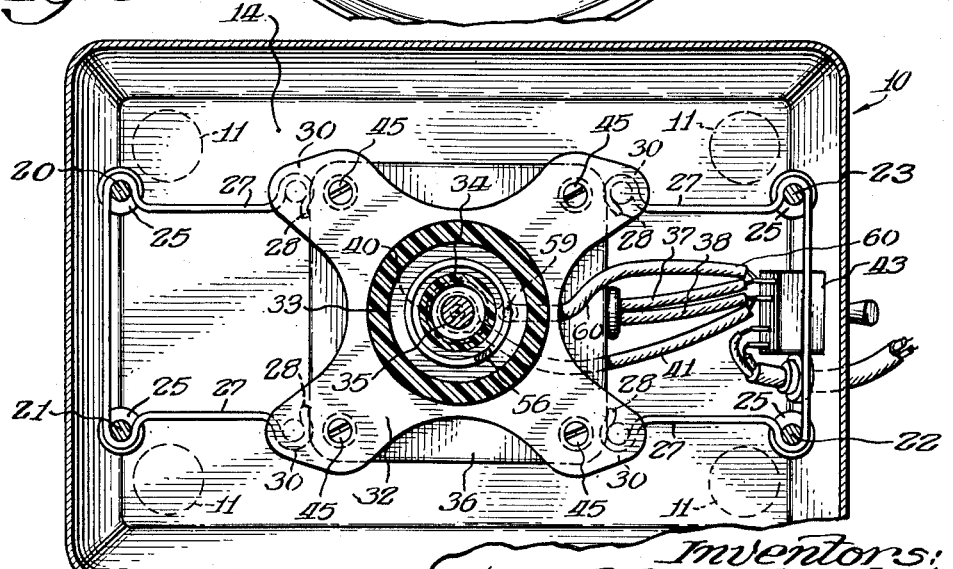

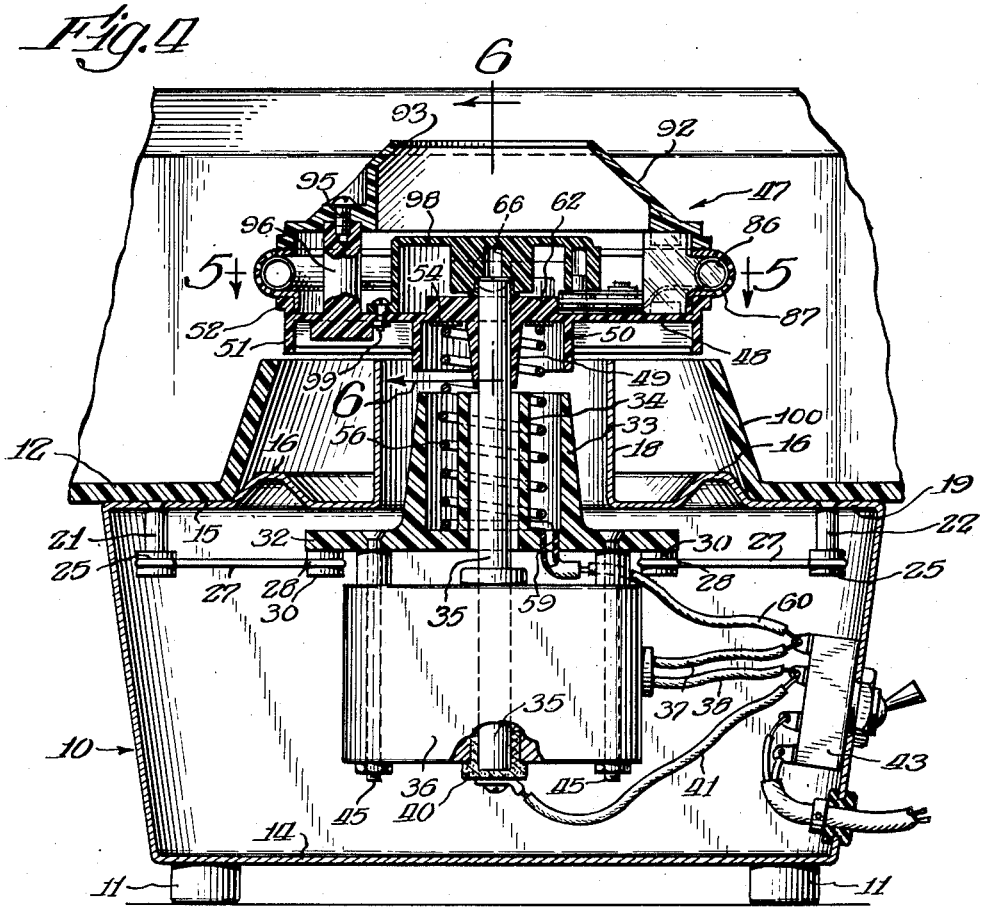
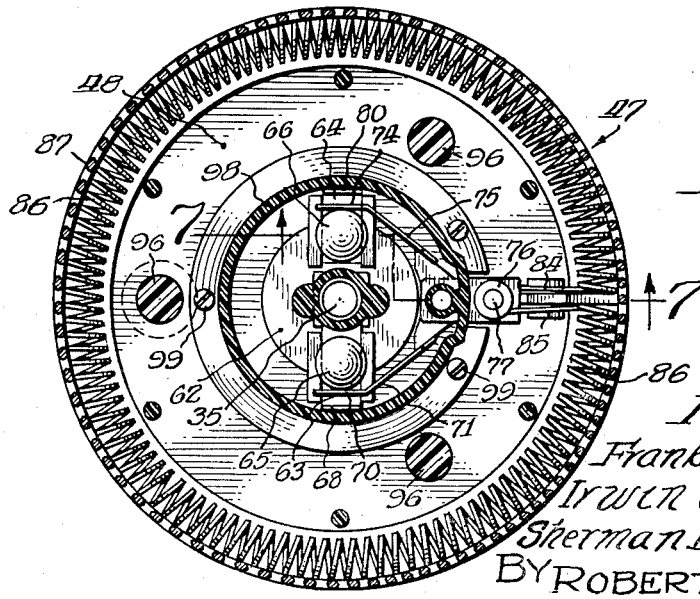

United States Patent Office 3,118,397
Patented Jan. 21, 1964

3,118,397
CANDY MAKING MACHINE
Frank R. Brown, Des Plaines, Irwin J. Grabel, Chicago, and Sherman D. Rubenstein, Skokie, Ill., assignors to Premium Engineering Co., Inc., Chicago, Ill., a corporation of Illinois
Filed Nov. 14, 1962, Ser. No. 237,498
5 Claims. (Cl. 107—8)

This invention relates to a candy making machine. The machine forming the subject matter of the present application utilizes cane sugar and makes so called cotton candy. The machine embodying the present invention is simple, economical to tool and manufacture and is effective for use by children and grownups in connection with making cotton candy. In addition, the new machine embodying the present invention has safety features embodied therein which make it safe to use and handle under various conditions.

In order that the invention may be understood, reference will be made to the drawings wherein:

FIGURE 1 is a side elevation with some parts broken away showing the new machine.

FIGURE 2 is a partial view looking down upon the top of the machine of FIGURE 1.

FIGURE 3 is a sectional view on line 3—3 of FIGURE 1.

FIGURE 4 is a sectional view on line 4—4 of FIGURE 2, the electric motor being shown in elevation with certain parts broken away.

FIGURE 5 is a sectional view on line 5—5 of FIGURE 4.

FIGURE 6 is a section on line 6—6 of FIGURE 4.

FIGURE 7 is a sectional view on line 7—7 of FIGURE 5.

FIGURE 8 is a sectional detail on line 8—8 of FIGURE 7.

FIGURE 9 is a sectional detail on line 9—9 of FIGURE 7.

The machine comprises combined housing and base 10 provided with legs 11, the housing supporting bowl 12. Housing 10 is preferably made of moulded plastic material and has bottom wall 14 and top wall 15. Top wall 15 of the housing is provided with upwardly extending annular portion 16 for centering bowl 12 thereon. Top wall 15 of the housing has at its inner edge upwardly extending sleeve 18. The entire housing may be made of separate pieces, cemented together, or moulded as a single unit.

Top wall 15 of the housing has peripheral portion 19 from which depends four supporting posts 20 to 23 inclusive. As illustrated in FIGURE 4, each of these posts has the bottom end portion grooved at 25. The posts are preferably integral with the housing and are adapted to support the mechanism making up the machine. As illustrated in FIGURE 3, posts 22 and 23 have disposed in groove 25 thereof wire spring support 27 whose ends are curled at 28 for engaging grooved bosses 30 forming part of a motor mounting plate. Two springs 27 are provided on opposite sides of the machine and bosses 30 are four in number and are arranged in a generally rectangular pattern. This arrangement provides a flexible and economical spring suspension. However, other arrangements such as a rubber pad between the motor and bottom 14 may be used as a vibration absorbing and sound deadening means.

Bosses 30 are part of motor mounting plate 32 preferably of plastic or electrically insulating material. Plate 32 has upwardly extending outer sleeve 33 which is inside of but spaced from sleeve 18 of the housing plate. Motor plate 32 has inner sleeve 34 to accommodate vertical steel shaft 35 of electric motor 36. Sleeves 18, 33 and 34 are generally concentric. Electric motor 36 is preferably a brushless type such as the induction type, this motor having a conventional stator with windings and a rotor which may be of the squirrel cage type or the motor may be of the permanent magnet type. Electric motor 36 has leads 37 and 38 for conducting current thereto.

Motor 36 is generally conventional except for the following particulars. Shaft 35 has its bottom free end supported in thrust bearing 40. Bearing 40 may be of any suitable type but preferably is of the type having a porous bronze body impregnated with graphite. Bearing 40 has at least part thereof made of electrically conducting material and constitutes one terminal for supplying current to a load. Bearing 40 has wire 41 connected thereto and for convenience wire 41 and wire 38 may be connected together to one terminal of On-Off switch 43. Motor 36 is secured to insulating motor plate 32 by bolts 45 extending from the plate through the motor and provided with nuts for the bolts.

Shaft 35 extends upwardly through inner sleeve 34 of the motor plate and supports a rotatable super-structure generally indicated by 47. This super-structure has as a part thereof plate portion 48 having depending inner flange portion 49 tightly fitted over steel shaft 35. Plate portion 48 of the super-structure also carries depending outer flange 50 concentric with but spaced from inner flange 49. Plate portion 48 of the super-structure has at the outer edge thereof peripheral wall portion 51, part of which extends below the level of plate portion 48 and the remainder of which extends above the level of plate portion 48 to form annular retaining peripheral portion 52.

Between inner and outer flanges 49 and 50 of the super-structure and against the bottom of plate portion 48 there is provided washer 54 of electrically conducting material such as brass or bronze. Washer 54 is preferably of bronze impregnated with graphite and cooperates with the top end turn of metallic helical coil spring 56. The coil spring is preferably of brass or Phosphor bronze and the bottom turn of the coil spring rests against the top surface of motor mounting plate 32. Inner sleeve 34 extends inside of the coils of spring 56. The bottom end of coil spring 56 is bent at 59 and passes through an opening in motor mounting plate 32. Bent end 59 of the coil spring is electrically connected to lead 60 which goes to switch 43 and is connected to the same terminal as motor lead 37.

Returning to super-structure 47, plate portion 48 has extending from the top face thereof a generally circular boss 62 provided with two radial diametrically opposed guide slots 63 and 64. Disposed in slots 63 and 64 are steel balls 65 and 66. These balls are the operating portions of two centrifugal switches. Referring for example to slot 63, this has fixed switch contact 68 which extends through opening 69 in super-structure plate portion 48 and contacts the blind face of metal washer 54. Cooperating with fixed contact 68 is movable contact 70 carried by spring arm 71 whose end is secured to metal eyelet 72. Similarly, ball 66 cooperates with movable contact 74 carried by spring arm 75 going to eyelet 76. Eyelets 72 and 76 are carried by insulated post 77 and are electrically insulated from each other by mica strip 78.

Cooperating with movable contact 74 is fixed contact 80 which is carried by metal strip 81 terminating in clip 82 in the form of a small sleeve tightly pressed over the end of steel shaft 35. Thus fixed contact 80 is electrically connected to steel shaft 35. Both of the switches are normally open when the motor is not turning or is running below a desired speed. Under normal operating conditions, when the motor is turning at full speed, the steel balls are thrown outwardly and serve to close both switches. Eyelets 72 and 76 are electrically connected to leads 84 and 85 of an electric heating element 86. This heating element is in the form of a helical spring bent to form a toroid. Heating element 86 consists of any suitable material which can be heated by flow of electric current therethrough to a temperature of about 250° F. This temperature as a rule, is sufficient to melt sugar and the radiant heat from the heating element is insufficient to damage the moulded plastic material of which the super-structure is constructed. Heating element 86 is disposed in the trough of an annular shroud 87. Shroud 87 is of steel having a large number of perforations therethrough and porcelain enamelled to prevent short circuiting the electric heating element. The perforations or openings in the shroud are of the order of about 1/32". The exact size is unimportant so long as the openings are large enough to permit the molten sugar to pass through. The pitch of heating element 86 should be sufficient so that there is space between the wire turns for the sugar to pass through. This space between turns is of the order of about .015" and sufficient to permit the molten sugar to pass through under the influence of centrifugal force.

Metal shroud 87 has bottom flange portion 88 which fits within annular peripheral retaining portion 52. Shroud 87 has top inner edge portion 89 upon which is disposed flanged peripheral portion 90 of top plate 92. Top plate 92 has opening 93 to provide access to the interior region between plate portion 48 and top plate 92. These two plates are firmly secured by bolts 95 engaging bosses 96 forming part of plate 48 and extending upwardly therefrom. Shroud 87 is of steel and has its surfaces covered with heat resistant enamel.

The centrifugal switch structure previously described is covered by cap 98 which is rigidly secured to plate 48 by screws or other fastening elements 99. Cap 98 prevents the introduction of any particles of sugar into the region within the cap where it might interfere with the operation of the switches. Stationary bowl 12 has extending from the bottom thereof inner upwardly extending portion 100 which stops near but is short of the bottom edge of peripheral portion 51 of plate 48. There is enough clearance around bowl portion 100 so that by tilting, the bowl may be raised and removed from the remainder of the machine for cleaning. Annular portion 16 of the housing insures the proper centering of the bowl during normal use.

Cane sugar can be introduced into opening 93 of the super-structure. Assuming that switch 43 is turned on and that the motor is operating properly, the heating coil will be energized by the closure of the centrifugal switches. The sugar particles will be whirled outwardly toward the heating coil. The hot wire of the heater will melt the sugar crystals. Centrifugal force will cause the molten sugar to flow through the coils of the heating element and through the openings in the shroud and pass out into bowl 12 in the form of fine cotton-like strands. Unless the motor is running properly, the heating coil will not be energized. By having the two centrifugal switches at both ends of the heating element, complete protection will be afforded against accidental shock if a person touches the heater coil when switch 43 is turned on but the motor is not operating due to some failure.

The construction disclosed and described is economical enough and simple enough so that it may be produced in quantity at a moderate price and sold in large quantity. It is understood that the various parts of the super-structure including the bowl and the plate, and the like, will be of plastic material and sufficiently strong to withstand the mechanical forces to which these parts will be subjected, and also capable of withstanding moderate heat developed by the heating element. The top free edge of upwardly extending sleeve 18 is above the free edges of sleeve 33 and flange 50. This arrangement will keep sugar out of the region about spring 56 and shaft 35.

This is a continuation-in-part of our earlier application Serial No. 185,922, filed April 9, 1962.

What is claimed is:

1. A machine for making candy comprising a base, a rotatable vertical metallic shaft supported by said base, an electric motor for rotating said shaft, a wiping metal contact for the lower portion of said shaft, a rotatable super-structure coupled to the top of said shaft for turning with said shaft, said super-structure including a rotatable washer of graphite impregnated bronze, an electric heating element carried by said super-structure, said heating element having two terminals, means for connecting one heating element terminal to the top end of said shaft, means for connecting the other heating element terminal to one face of said washer, said washer being insulatingly supported by said super-structure to rotate therewith in concentric relation to the top portion of the rotatable shaft, said washer having its other face accessible, a stationary helical metallic spring disposed in concentric relation to the upper portion of said shaft with one end of said spring pressing against said accessible washer face, the other end of said spring constituting a terminal for connection to one side of a source of electric power with the other side of said source of electric power being connected to the contact at the lower portion of said shaft, said means for connecting the heating element terminals including centrifugal type switch means for keeping the heater circuit open except when said electric motor is rotating said superstructure at least at a predetermined speed.

2. The construction according to claim 1, wherein said centrifugal switch means include two electric switches connected to the two heating element terminals.

3. An candy making machine comprising a housing, a brushless electric motor having a metallic shaft adapted to rotate during motor energization, means for supporting said motor so that said shaft is vertical with a free top portion extending above and beyond the motor, said motor support means including an insulating motor mounting plate adjacent the top end of the motor and having an upwardly extending sleeve spaced from but surrounding a substantial portion of the free top portion of the motor shaft, means cooperating with the bottom of said shaft for conducting electric current from a stationary wire to said shaft, an insulating plate secured to rotate with said shaft, said insulating plate having a first downwardly extending flange around a portion of said shaft, a washer of graphite impregnated bronze for said insulating plate disposed around said first flange and having a free face looking toward the motor, said insulating plate having an outer flange extending downwardly therefrom with the washer being between the two flanges, a stationary metallic helical spring concentric with but spaced from the free portion of said shaft, said spring lying within the motor mounting plate sleeve, said spring being supported on the motor mounting plate concentric with but spaced from the shaft, the top end of said spring bearing against the free face of said washer, the bottom of said spring providing a terminal for conducting electric current to the rotating washer, said insulating plate having a bowl-shaped construction for holding a quantity of cane sugar, said bowl-shaped construction including an outwardly curved support of open material having an electrically insulating heat resistant outer surface so that cane sugar in said whirling super-structure can work its way outwardly through the support, an electric heating element disposed at the inside curved portion of said support for heating said sugar as it passes therethrough, means for electrically connecting the terminals of said heating element to said shaft and to said washer respectively, means supported by said housing for collecting sugar passing through the rotating structure, a top wall for said housing having an upwardly extending sleeve, the housing top wall sleeve being outside of said insulating plate outer flange, the free end of said housing top wall sleeve being above the free end of said outer flange and above the free end of the mounting plate sleeve, a centrifugal type electric switch supported by said insulating plate, said electric switch being connected in the heating element circuit to maintain the heater circuit normally open except when the motor is operating normally and rotating said insulating plate.

4. The construction according to claim 3 wherein said insulating plate carries two normally open electric switches on opposite sides of the plate center and carries two metal balls for centrifugal operation to close said two switches, said switches being connected on opposite sides of the heating element so that said heating element is electrically isolated when the switches are open.

5. The construction according to claim 3 wherein said motor mounting plate has an inner sleeve disposed inside of the helical spring but clearing the motor shaft.

References Cited in the file of this patent
UNITED STATES PATENTS

| | | |
|---|---|---|
| 3,036,532 | Bowe | May 29, 1962 |
| 3,070,045 | Bowe | Dec. 25, 1962 |